United States Patent [19]

Kulisch

[11] Patent Number: 4,622,650
[45] Date of Patent: Nov. 11, 1986

[54] CIRCUITRY FOR GENERATING SCALAR PRODUCTS AND SUMS OF FLOATING POINT NUMBERS WITH MAXIMUM ACCURACY

[76] Inventor: Ulrich Kulisch, Im Eichbaumle 37, 7500 Karlsruhe, Fed. Rep. of Germany

[21] Appl. No.: 764,517

[22] Filed: Aug. 9, 1985

Related U.S. Application Data

[63] Continuation of Ser. No. 438,561, Nov. 2, 1982, abandoned.

[30] Foreign Application Priority Data

Nov. 5, 1981 [DE] Fed. Rep. of Germany ....... 3144015

[51] Int. Cl.$^4$ .............................................. G06F 7/38
[52] U.S. Cl. ................................... 364/748; 364/745
[58] Field of Search ............... 364/730, 748, 749, 736, 364/754, 745

[56] References Cited

U.S. PATENT DOCUMENTS

| | | | |
|---|---|---|---|
| 3,388,385 | 6/1968 | Lukes | 364/745 |
| 3,699,326 | 10/1972 | Kindell et al. | 364/745 |
| 3,871,578 | 3/1975 | Van De Goor et al. | 364/748 |
| 4,054,787 | 10/1977 | Pos | 364/748 |
| 4,075,704 | 2/1978 | O'Leary | 364/748 |
| 4,130,879 | 12/1978 | Cushing | 364/748 |
| 4,135,249 | 1/1979 | Irwin | 364/758 |
| 4,149,261 | 4/1979 | Harigaya et al. | 364/745 |
| 4,229,800 | 10/1980 | Gregorian et al. | 364/745 |
| 4,295,203 | 10/1981 | Joyce | 364/745 |
| 4,338,675 | 7/1982 | Palmer et al. | 364/748 |
| 4,409,668 | 10/1983 | Yoshida | 364/745 |
| 4,429,370 | 1/1984 | Blau et al. | 364/748 |
| 4,476,537 | 10/1984 | Blau et al. | 364/748 |
| 4,490,807 | 12/1984 | Chevillant et al. | 364/736 |
| 4,534,010 | 8/1985 | Kobayashi et al. | 364/748 |

OTHER PUBLICATIONS

Kuuth; *The Art of Computer Programming*, vol. 2; pp. 213–223, 1969.
Kulisch; "An Axiomatic Approach to Rounded Computations" *Numer. Math.*, vol. 18; pp. 1–17; 1971.
Yohe; "Roundings in Floating-Point Arithmetic"; *IEEE Trans. on Computers*, vol. C-22, No. 6, pp. 577–589, Jun. 1973.
Sasao; "Multiple-Valued Decomposition of Generalized Boolean Functions and the Complexity of Programmable Logic Arrays"; *IEEE Trans. on Computers*, vol. C-30; No. 9, pp. 635–643, Sep. 1981.
Clegg; "Use of SPOOF's in the Analysis of Faulty Logic Networks" *IEEE Trans. on Computers;* vol. C-22, No. 3, pp. 229–234, Mar. 1973.
Bohlender; "Floating-Point Computation of Functions with Maximum Accuracy" *IEEE Trans on Computers*, vol. 26, No. 7, pp. 621–632 Jul. 1977.
Sproul "High-Speed Floating-Point Accumulator" *IBM Technical Disclosure Bulletin*, vol. 14, No. 10, pp. 2934–2936, Mar. 1972.

*Primary Examiner*—James D. Thomas
*Assistant Examiner*—Dale M. Shaw
*Attorney, Agent, or Firm*—Sprung Horn Kramer & Woods

[57] ABSTRACT

Circuitry for generating scalar products and sums of floating point numbers with maximum accuracy and circuitry and a method for electronic computers by which scalar products of floating point numbers of the type pi, qi, ES(b,l,e1,e2) are summed with full precision in a fixed point representation by means of a summing unit (ALU) and one or more accumulator registers (ARC1, ARC2) with cells (Ai, j) for storing of codes of a base b having a length (2l+2e1+2e2) for fixed point representation and certain overflow positions. By control means (SHR, E, Contr) the mantissas of products are delivered depending on the value of the respective exponents into the summing unit (ALU). By control means (RD, Contro), rounding operations (O, ◊, ∇, △) demanded by the higher level computer are performed, and a rounded floating point number (□ c ∈ S(b,l,e1,e2)) and overflow (OF) and underflow (UF) criteria are delivered. Parallel, serial and word organized summing units (ALU) and accumulator registers (ACR) are usable and in another embodiment, the multiplication of the factors (pi, qi) is performed using a table of multiples store.

12 Claims, 16 Drawing Figures

| Inputs | | | | | Outputs | |
|---|---|---|---|---|---|---|
| Sub (Ai - Bi) | Add | Ai | Bi | Cs(i-1) | Si | Csi |
| (0) | 1 | 0 | 0 | 0 | 0 | 0 |
| 0 | 1 | 0 | 0 | 1 | 1 | 0 |
| 0 | 1 | 0 | 1 | 0 | 1 | 0 |
| 0 | 1 | 0 | 1 | 1 | 0 | 1 |
| (0) | 1 | 1 | 0 | 0 | 1 | 0 |
| 0 | 1 | 1 | 0 | 1 | 0 | 1 |
| 0 | 1 | 1 | 1 | 0 | 0 | 1 |
| (0) | 1 | 1 | 1 | 1 | 1 | 1 |
| (1 | 0 | 0 | 0 | 0 | 0 | 0) |
| 1 | 0 | 0 | 0 | 1 | 0 | 1 |
| 1 | 0 | 0 | 1 | (0) | 1 | 1 |
| (1 | 0 | 0 | 1 | 1 | 1 | 1) |
| (1 | 0 | 1 | 0 | 0 | 1 | 0) |
| 1 | 0 | 1 | 0 | 1 | 0 | 0 |
| 1 | 0 | 1 | 1 | 0 | 0 | 0 |
| (1 | 0 | 1 | 1 | 1 | 1 | 1) |

*Fig. 1e*

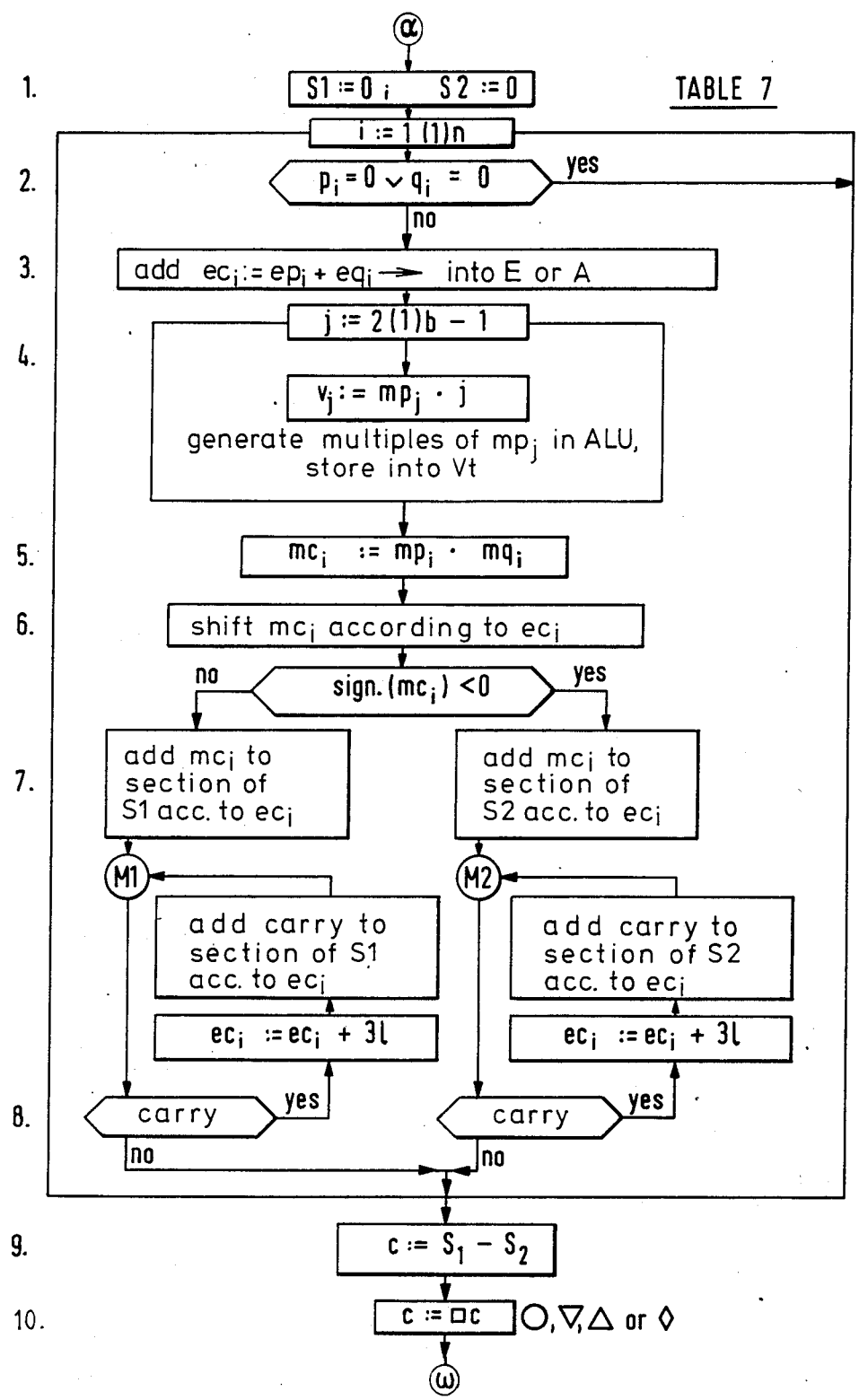

CIRCUITRY FOR GENERATING SCALAR PRODUCTS AND SUMS OF FLOATING POINT NUMBERS WITH MAXIMUM ACCURACY

This application is a continuation of application Ser. No. 438,561, filed Nov. 2, 1982, now abandoned.

BACKGROUND OF THE INVENTION

Circuitry in an electronic computer containing a summing unit which is connected with inputs and outputs to an accumulator register which consists of cells for the storing of codes of a base and containing a control unit, controlling the summation of numbers especially of products from factors, which are delivered by the computer in a floating-point representation to the circuitry, and controlling rounding and delivering of the generated sum from the accumulator register to the computer in a floating-point representation.

Known computers generate arithmetic operations for integer numbers correctly with full precision, in a certain range of the integers which is represented on the computer.

Generally a real number is represented in form of an infinite decimal- (or b-al) fraction, eg. $\pi = 3.14159\ldots$.

Computers can only approximate such terms i.a. represent them with a finite number of digits. Representation in the form of fixed or floating-point numbers are common. In this representation approximation of real numbers only a finite number of digits is used.

Such representation of numbers on the computer may cause the fact, that, after the performing of operations $+, -, \times, /$ corresponding to the ordinary rules for real numbers, the result in general does not fit exactly to the basic scheme of numbers, which can be represented on the computer as floating or fixed point numbers, e.g. the multiplication causes doubling of the mantissa's length. Even if the result of processing of two numbers, representable on the computer, is another number, which is representable on the computer, the operations $+, -, \times, /$ can be performed only by approximation. In general such approximation procedures are called rounded operations.

During the past, such approximation operations for numbers, which are representable on the computer, were implemented more or less according to intuitions. All computers on the market today suffer on more or less serious deficiencies in this respect.

In case of higher levelled mathematical structures such as complex numbers or matrices, the operations of the computer are defined by the following considerations. Formulas are known to derive operations with complex numbers or matrices from operations with real number. Operations of complex numbers and matrices representable on the computer are defined with the same formulas where instead of the real operations their approximations for computer representable numbers (floating-point numbers) are executed. This usual method in case of numerical algorithms causes complicated error propagation and error analysis.

A remedial measure against such deficiencies of known operations consists in a theory, developed by the inventor, which is presented in extensive form in:

Kulisch, U. and Miranker, W. L.: Computer Arithmetic in Theory and Practice, Academic Press 1981.

There it is proposed to define operations of computers for real number, real vectors, real matrices, complex numbers, complex vectors, and complex matrices as well as intervals of real and complex numbers, vectors and matrices according to the principles of semimorphism, which will be given in the following chapter shortly.

Let M represent one of the given sets of numbers and N the corresponding subset of M, which is representable on the computer. In this case operations of N must conform to the following rules:

(For explanation of the used symbols compare Tab. 1)

$$(RG) \quad \bigwedge_{a,b \in N} a \boxdot b := \Box(a * b) \text{ for all operations}$$

In this case $\Box: M \rightarrow N$ is a mapping with the following properties:

$$(R1) \quad \bigwedge_{a \in N} \Box a = a \text{ (rounding)}$$

$$(R2) \quad \bigwedge_{a,b \in M} (a \leq b \rightarrow \Box a \leq \Box b) \text{ (monotonicity)}$$

$$(R3) \quad \bigwedge_{a \in M} \Box(-a) = -\Box a \text{ (antisymmetry)}$$

Thus $\Box$ is a monotone antisymmetric rounding operation.

In the stated sets of intervals, the rounding operation must satisfy the additional equation.

$$(R4) \quad \bigwedge_{a \in M} a \subseteq \Box a \text{ (upward directed rounding)}$$

Here $\Box$ denotes the inclusion.

The mapping of real numbers R into a subset of numbers (floating-point numbers) representable on the computer we define additionally two monotone, directed rounding operators $\Delta$ and $\nabla$, by (R1), (R2), and by $$(R4) \quad \bigwedge_{a \in R} \nabla a \leq a; \quad \bigwedge_{a \in R} a \leq \Delta a,$$

as well as operations corresponding to the above mentioned rounding operators in conjuction with equation (RG). Questions of uniqueness are discussed in: Kulisch, U. and Miranker, W. L.: Computer Arithmetic in Theory and Practice, Academic Press 1981.

The monotone downwardly directed rounding means, that the whole interval between two maschine numbers is mapped to the left number. The monotone upwardly directed rounding has the opposite property.

An extensive theory that has been developed shows that a number of extremely useful properties of the explained roundings and connected operations hold in the spaces mentioned above. E.g. all operations defined in this way provide for all spaces mentioned above maximum accuracy, that means no further element of the applied grid lies between the correct result of an operation a*b and its approximation a $\boxdot$ b.

Operations, defined by the above outlined new theory, are especially in cases of higher level spaces (complex numbers, matrices etc.) fundamentally different to the corresponding operations implemented in known computers.

Computers available today do not perform operations corresponding to the above given formulas. Implementation of rounding and connecting operations corresponding to the above mentioned formulas for complex numbers and complex intervals, for real and complex vectors and matrices as well as real and complex interval vectors and interval matrices by means of hardware elements according to the invention out-dates the present state of engineer's computers.

Along with the theory, it also has been shown that all these operations can be implemented on the highest level of computer language if for the mapping of the real numbers onto computer representable floatin-point numbers three roundings are made available by the computer, which are a monotone antisymmetric rounding $\bigcirc$ (e.g. rounding to the nearest computer representable number), the two monotone and directed roundings $\nabla$ and $\Delta$ along with the operations defined by (RG) and these roundings for addition (+), substraction (−), multiplication (·), division (/) of computer representable floating-point numbers as well as for scalar product (*) of two vectors of a certain dimension n.

Thus 15 basic connecting operations exist corresponding to following symbols:

$\oplus \ominus \odot \oslash \boxdot \triangledown \triangledown \triangledown \triangledown \triangle \triangle \triangle \triangle \triangle$ In traditional numerical analysis only four of these operations with a rounding according to common rules are used: $\oplus \ominus \odot \oslash$.

The so called interval arithmetic makes use of eight operations wich are: $\triangledown \triangledown \triangledown \triangledown$ and $\triangle \triangle \triangle \triangle$.

Hardware implementations of the operations of addition, subtraction, multiplication and division given by equation (RG) and the three roundings $\bigcirc$, $\nabla$, $\Delta$ represent state of the art.

But hardware implementation of such operations like scalar products (inner products of vectors) of any relevant dimension corresponding to RG in connection with three roundings $\bigcirc$, $\nabla$, $\Delta$ representing the operations $\circledast$, $\triangledown$, $\triangle$ on computers, as will be explained now, are completely new and inventive.

If T denotes the set of computer representable floating-point numbers, then for vectors $a=(a_i)$ and $b=(b_i)$ of floating-point numbers $a_i$, $b_i \in T$; $i=1(1)n$ the operations $\circledast$, $\triangledown$ and $\triangle$ are defined by $$(RG) \bigwedge_{a,b,\in T^n} a \circledast b := \circledast \left( \sum_{i=1}^{n} a_i \cdot b_i \right) \quad (I)$$

$$(RGu) \bigwedge_{a,b,\in T^n} a \triangledown b := \triangledown \left( \sum_{i=1}^{n} a_i \cdot b_i \right)$$

$$(RGo) \bigwedge_{a,b,\in T^n} a \triangle b := \triangle \left( \sum_{i=1}^{n} a_i \cdot b_i \right)$$

for any given n. Multiplication and addition symbols on the right hand side denote in these cases correct multiplication and addition of real numbers. (Explanation of symbols: compare tab. 1)

Implementation of these operations, by means of software elements, provides generating of the demanded results with maximum accuracy, but extend by factors the time expenditure on such operations if executed in hardware.

Additionally a fair amount of internal high speed store is occupied, while performing these operation. Thus, it is not available for other often required operations, which also decelerates expenditure on organization of programs.

SUMMARY OF THE INVENTION

The purpose of the invention is to present a computer which provides implementation on the above mentioned operations by means of hardware elements, which make directly available especially the calculation of scalar products of any wanted dimension corresponding to formula (RG) with the choice of all monotone roundings, especially the monotone directed roundings $\Delta$ and $\nabla$, avoiding the above mentioned disadvantages of implementation of the algorithms by means of software elements.

The given problem is solved according to the invention by equipping a computer with circuitry comprising an accumulator register with at least such a number of code storing cells given by the length of the mantissa of the numbers to be summed plus twice the sum of the absolute value of the smallest and largest exponent of the floating-point numbers, further comprising control circuitry, connected to the accumulator register and the summing unit, for the control of summing the numbers in a fixed point representation into the accumulator register.

There are various implementations of circuits possible, which are working corresponding to the equations (RG),(RGu), (RGo) and if required similar rounding operations by means of hardware elements.

In the following description some examples are given.

Each implementation depends on the base of the used number system and format. The shown examples refer to floating-point numbers represented in so called sign magnitude representation with exponents. In cases of other representations (e.g. complement representation of negative numbers and/or characteristic in the exponent) the circuit is to be constructed using equivalent elements for corresponding operations following the rules known to the average engeneer skilled in the art. Definitions of the representation of numbers used in the examples are:

A normalized floating-point number x is (represented in sign magnitude representation) a real number in the following configuration:

$x = *m \cdot b^e$.

In this case $* \in \{+, -\}$ denotes the sign (sign (x)), m denotes the mantissa (mant (x)), b the base of the applied number system, and e the exponent (exp(x)). b stands for an integer number whereas $b > 1$. The exponent is an integer number and ranges between the two numbers $e1 \leq e2$. m is the mantissa given by the form $$m = \sum_{i=1}^{l} x[i] \cdot b^{-i}.$$

x[i] denotes the figures of the mantissa. It is $x[i] \in \{0, 1, \ldots b-1\}$ for all $i = 1(1)n$ and $x[1] \neq 0$.

The set of all normalized floating-point numbers doesn't comprise the number 0.

In order to achieve a unique representation of 0 it is additionally stated that sign (0)=+, mant (0)=0,00 ... 0 (n zeros behind the decimal point) and exp (0)=e1.

Such a floating-point system depends on four parameters b, 1, e1, and e2. We denote it in the following way: S=S(b, 1, e1, e2).

In order to execute the equations (RG), (RGu), and (RGo), the products $a_i \cdot b_i$ are performed correctly by the computer.

Such procedure delivers a mantissa of 21 digits and an exponent ranging from $2e1-1 \leq e \leq 2e2$.

Calculation of the scalar product then is reduced to the computation of sums of the form.

$$\square \left( \sum_{i=1}^{n} c_i \right) ; n\epsilon N; c_i = a_i \cdot b_i \qquad (II)$$

In this case $c_i$ are floating-point numbers of double length, $c_i \epsilon S(b,21,2e1-1,2e2); i=1(1)n$.

The implementation of the summing network in any case provides that a sum according to (II) will be generated with full precision, without loss of information.

Up to now, no corresponding implementation by means of hardware elements are known.

Full implementation of (I) and (II) by means of high speed hardware or hardware elements supporting high speed execution of (I) and (II) are a novelty of revolutionary effect on computing.

BRIEF DESCRIPTION OF THE DRAWINGS

FIGS. 1 to 6 show several variations of summing networks performing the formulas given, wherein:

FIG. 1 is a parallel summing network; FIGS. 1a to 1e show details of FIG. 1;

FIG. 2 is a serial summing network;

FIG. 3 is a word organized accumulator register where the length of summing network corresponds to length of words;

FIG. 4 is a summing network; with two accumulator registers and integrated multiplication network

FIG. 6 is a circuit overview of FIG. 4;

Figure 1:
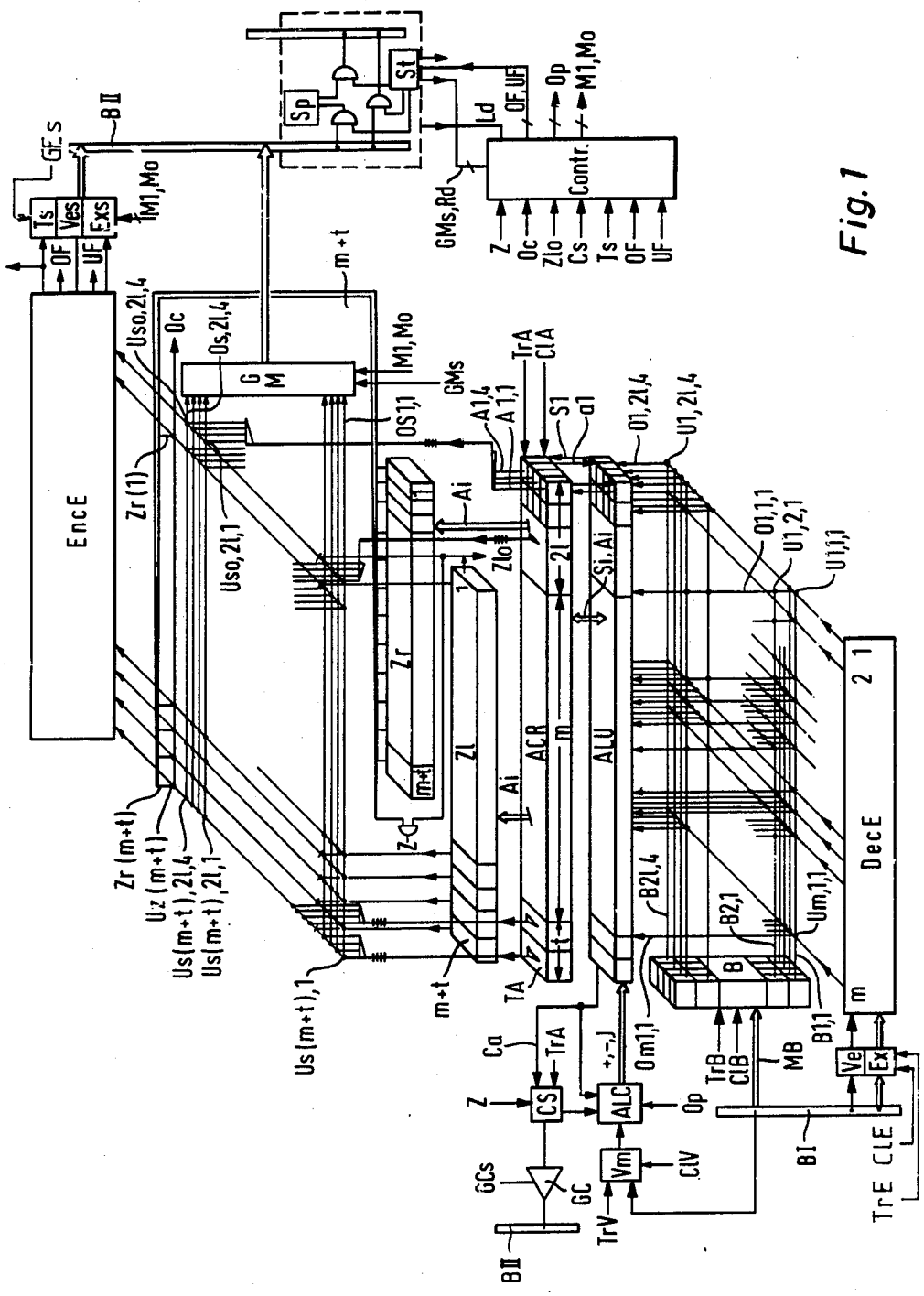
Figure 2:
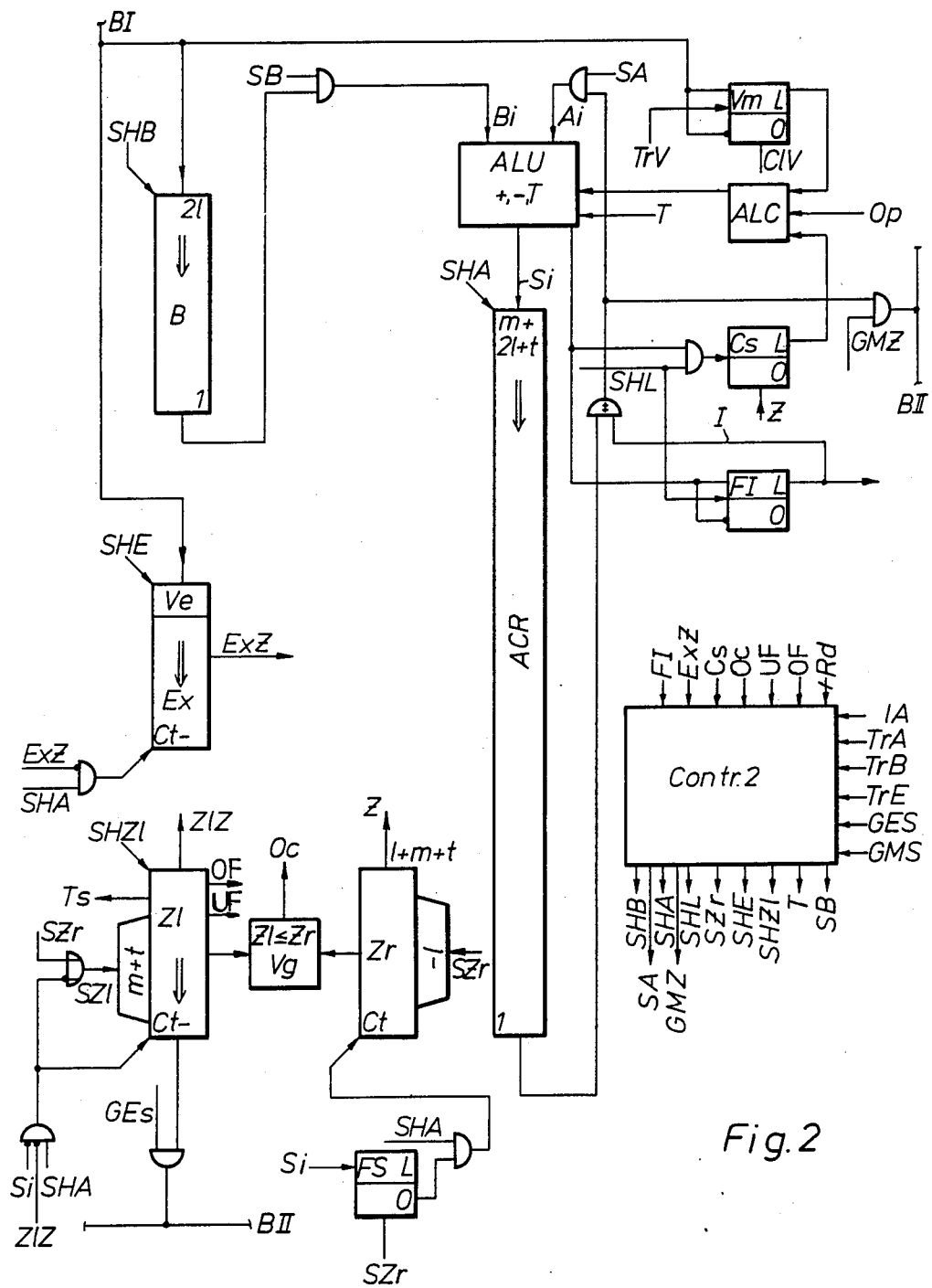
Figure 3:
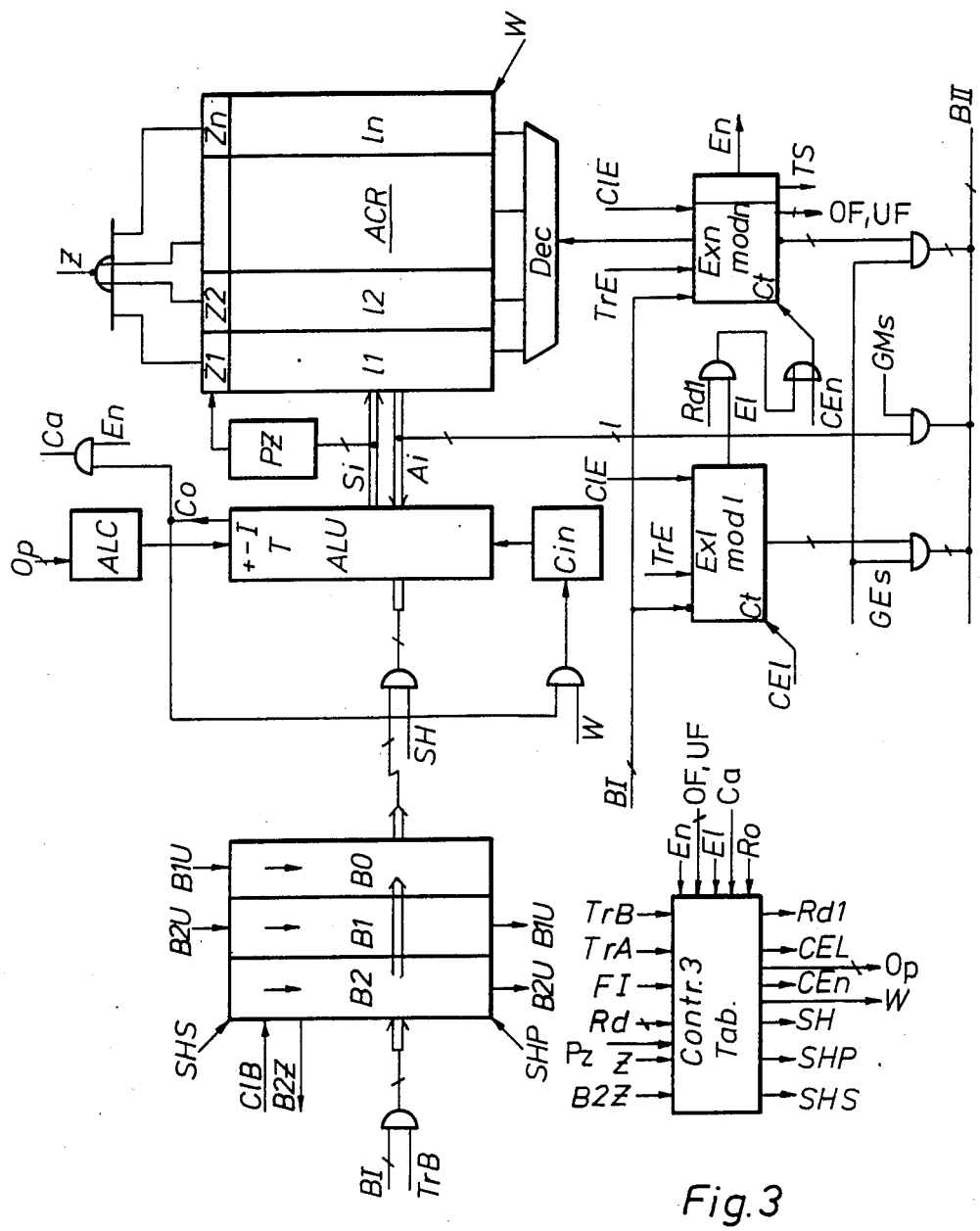
Figure 4:
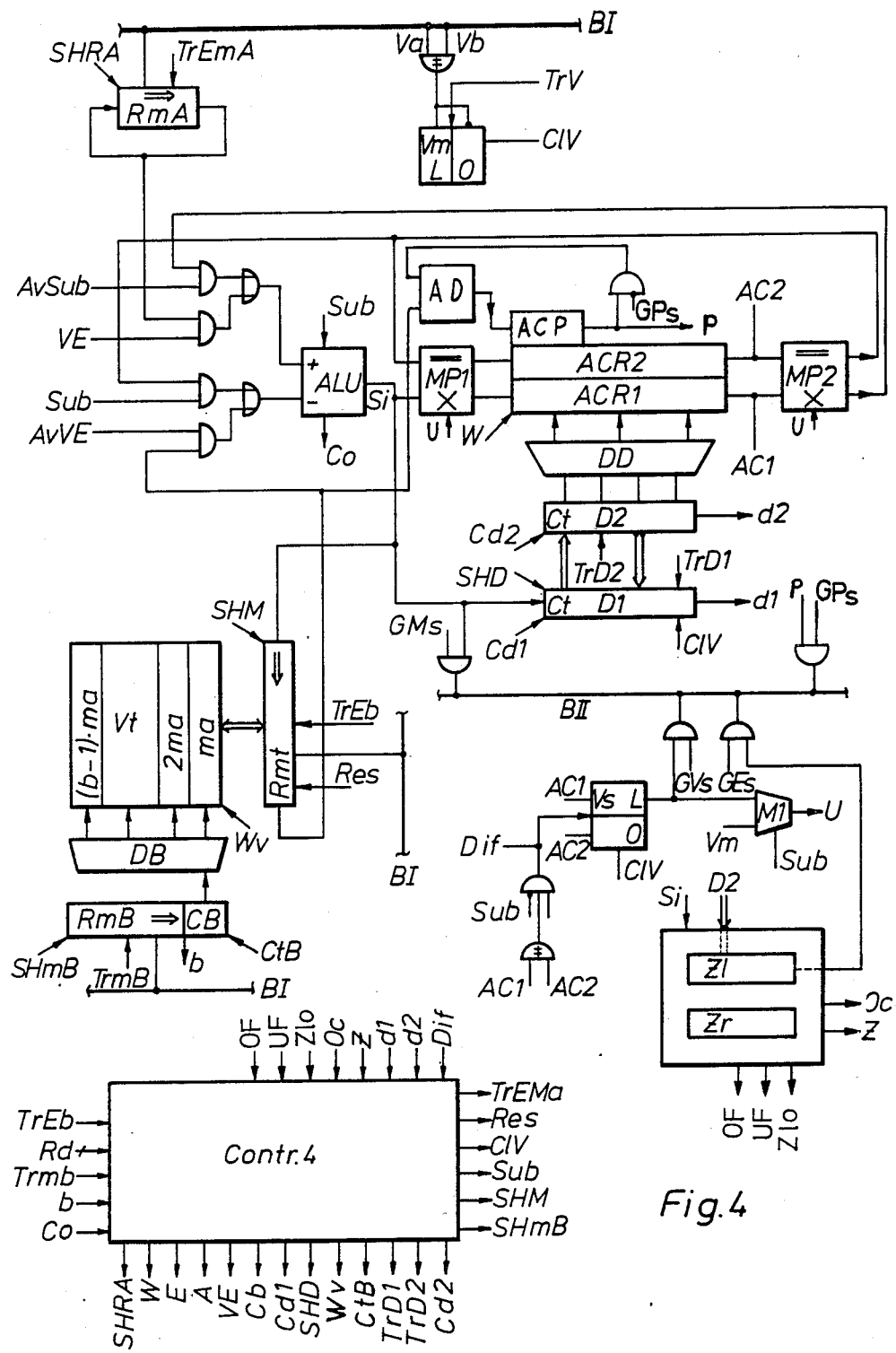
Figure 6:
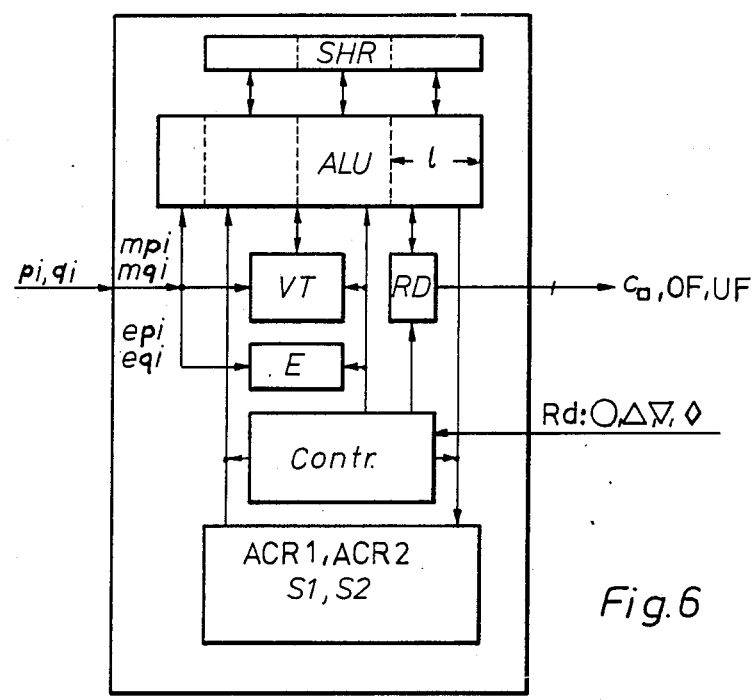

Tab. 1 is a table of symbols;

Tab. 2 is a flow diagram of the process of the circuit of FIG. 1;

Tab. 3 is a list of symbols corresponding to FIG. 1;

Tab. 4 is a list of symbols corresponding to FIG. 2;

Tab. 5 is a list of symbols corresponding to FIG. 3;

Tab. 6 is a list of symbols corresponding to FIG. 4;

Tab. 7 is a flow diagram of the process of the circuit of FIG. 6.

DETAILED DESCRIPTION OF THE INVENTION

As an example FIG. 1 is showing an accumulator register ACR of the length 2e2+21+2e1, which provides that all terms of a sum can be added up without loss of information. This arrangement allows storing of all terms of the sum in correct position without exponent. For registrating of carries, which may eventually be caused by addition, a certain number of further t overflow cells TA to the same base may favorably be added at left end positions of the register. The accumulator thereby provides correct accumulation of any sum (II) of n terms without loss of information. Even if $b^t$ overflows occur, they are kept without loss of information.

For example:
b=16, e1=−72, e2=72, 1=14 and t=4

In this case the accumulator has a length of t+|2e1|+21+2e2=320 hexadecimal cells or 1280 bit position calls.

A similar accumulator used for decimal arithmetic needs properly chosen the following digit calls:
b*=10, e1*=−99, e2*=99, 1*=13 and t*=4. In this case the accumulator would contain 426 decimal cells. This corresponds to 1704 bit position cells.

Depending on the hardware used, it may represent an optimum choice of the length of the accumulator register using an integral multiple of 1 cells for it.

FIG. 1 is showing an accumular register ACR consisting of storing cells with a summing network ALU, which is linked to its input and output connectors. Tetrades respectively decades are shown as perspectively drawn boxes. In the summing network ALU the circuitry for tetrades passes the carries from right to left, from tetrade to tetrade. The highest carry is delivered to a flip-flop Ca.

The operands are supplied from the higher level computer to the circuitry by an information bus line BI in the form of the described floating-point representation.

By means of a clear exponent signal C1E, the register Ex, which stores the exponent of the sum operand and the corresponding sign flag flip-flop Ve, is cleared and by means of a load complement signal TrE, the information is gated from the information bus line BI into the register and flip-flop.

After clearing the register B by a clear register signal C1B, a transfer signal TrB follows which transfers the mantissa MB od ouble length (21), which originates from a mulitplication operation performed outside of the shown circuit, from information bus line BI to be an operand for summing into register B. After clearing the sign flag of mantissa flip-flop Vm by clearing signal C1V, the sign of the operand is gated to the sign flip-flop Vm by the following transfer signal TrV.

The exponent and its sign are transfered from the exponent register of sum operand Ex Ve to a decoder of exponent and sign DecE, which delivers m=2 |e1| +2e2 output signals. These output signals gate the output signals of register B by an and-gate und or-gate network in a way which provides that the mantissa appears parallel shifted by the amount just stored in the exponent register.

Thereby the mantissa is delivered from the output connectors of the gating network in correct position to the second operator input of the summing network ALU.

As can be seen, this gating network is made up of m·21·4 and -gates "U" and m+21 or-gates "O".

These or-gates connecting the mantissa of the sum shown are implemented as "wired-or". FIG. 1 is showing in a simplified form some of the gates, where dots represent the and-gates U and lines represent the or-gates O with triple indices i,j,k indicating the position of decoder DecE, the position of register B, and the tetrade position connected to the respective gate inputs.

The operations for the gating network, which might also be called a multiplexer, correspond to $$O_{k,l,r} = \bigvee_{j=1}^{2l} U_{k,j,r} = \bigvee_{j=1}^{2l} (DecE_{(i+j)} \wedge B_{jr}):$$

$$k = 1, 2 \ldots m$$
$$r = 1, 2, 3, 4,$$

The other inputs of the summing network ALU are correspondingly linked to the outputs Ai of the accumulator register ACR, and the outputs Si of the summing network ALU are linked to corresponding inputs of the accumulator register ACR. The sum respectively the result of the operations performed by summing network ALU are fed to the accumulator register ACR by transfer signal TrA. If a carry is caused by inversion of the sign, the signal Ca of the summing network ALU will be fed to the sign flag flip-flop of sum Cs together with the same transfer signal TrA, thereby inverting its contents. The sign flag of sum flip-flop Cs may be implemented as a counting flip-flop; changing its state each time the sign changes.

The control circuit ALC of the summing network ALU generates according to the signals of the sign flag of mantissa register Vm and sign flag of sum register Cs operation signals for addition (+) or subtraction (−) for the summing network ALU.

In addition to the summing network ALU, a zero detection from left to right circuit Zl and a zero detection from right to left circuit Zr are connected to the accumulator register ACR. By means of zero detection circuit Zl, the first significant position at left hand side is determined. The logical equation of this test circuit corresponds to $$Zl(i) = \left( \bigvee_{j=i}^{m+t} \bigvee_{k=1}^{4} A_{j,k} \right) \wedge \overline{\left( \bigvee_{j=i+1}^{m+t} \bigvee_{k=1}^{4} A_{j,k} \right)} ;$$

$$j = 1, 2 \ldots (m + t)$$
$$j = (m + t) \text{ highest value position}$$

If at the left hand side more than m+t positions are equivalent to zero, a further gate circuit delivers signal Zlo meaning no "1" present. The logical equation of this gate is given by $$Zlo = \overline{\left( \bigvee_{j=1}^{m+t} \bigvee_{k=1}^{4} A_{j,k} \right)}$$

Overflow respectively underflow of the sum within the admitted boundaries of the result are detected by or-gates OF and UF given by equations:

$$OF = \bigvee_{i=2|e1|+e2}^{m+t} Zl(i); \quad UF = \bigvee_{i=1}^{e1-1} Zl(i) \vee Zlo \wedge \overline{Z}$$

The zero detection circuit Zr determines the first non zero position from right to left. The logical equation is given by $$Zr(i) = \bigvee_{j=1}^{i} \bigvee_{k=1}^{4} A_{j,k} [j = 1, 2, \ldots, i]$$

$j = 1$ least significant position

Controlled by the output signals of zero detection circuit from left to rigth Zl, the outputs Ai of the accumulator register ACR are fed to the output gates GM by a demultiplexer network built with and-gates and or-gates beginning from the highest significant position. The logical equations of the and-gates and or-gates, which which implement the demultiplexer, correspond to:

$$O_{s,k,r} \bigvee_{j=0}^{m+t} U_{s,j,k,r} = \bigvee_{j=0}^{m+t} Zl_j \wedge A_{(2l-k+j),r};$$

$$k = 1, 2 \ldots 2l; \; re = 1, 2, 3, 4$$

FIG. 1 again is showing in simplified form the and-gates Vs gating accumulator sum outputs as dots and the or-gates Os connecting the mantissa of the sum as lines corresponding to "Wired-or" gates. The output gates generating mantissa of sum GM, which transfer their input signals by control signal GMs to information bus line BI, may be implemented for example as tri-state-gates.

A further gate circuit Oc,Uz is gating in pairs the signals of zero detection from right to left Zr respectively left to right Zl and thus delivers at the output Oc a signal, if signals, unequivalent to zero, occur at the right side of the ranges of Zl valid positions. This signal serves to trigger rounding operations. It is given by equation $$Oc = \bigvee_{j=1}^{m+t} Zr_j \wedge Zl_j = \bigvee_{j=1}^{m+t} Uz_j$$

Further on the and-gate Z gates a no "1" signal Zlo detected by the circuit Zl with a no "1" signal of circuit Zr (m+t) and thus generates an output signal which states that the whole contents of the accumulator register ACR is zero.

$$Z = Zr(m+t) \wedge Zlo$$

Additionally the encoder network for exponent EncE is fed with signals of zero detection circuit Zl, generating at its output the encoded exponent of the sum, which is held in the accumulator register ACr being valid positions of the mantissa.

By means of control signal GEs, the mentioned signals are transferred to information bus line BII. By means of gate GC and control signal GCs, the output of sign flag of sum flip-flop Cs can accordingly be fed to information bus lines BI, BII and thus is available at the higher level computer.

The control signals ClA, ClB, ClE, ClV, as well as the control signals TrA, TrB, TrE, TrV, and GMs, GEs, GCs are provided by the higher level computer control unit St to the circuitry, as soon as the operands are available for transfer from information bus line BI or is ready for acceptance on information bus line BII.

The signals Z, Oc, Ca, Ts, OF, UF, Zlo will in a similar manner be transfered via gates to information bus line BII or be fed directly to the control unit of the circuitry Contr and the control unit St of the higher level computer. According to the shown example, operation control signals Op, generated by control unit or the circuitry Contr, are directly connected to the control circuit for summing network of operation ALC, which evaluates these signals, and, depending from them, it is providing control signals to perform the following functions:

1. If an overflow occurs and thereby the sign flag of sum network Cs signals that the sum in the summing network is negative, an inversion signal I is delivered into the summing network ALU, and thus the sum is fed to the accumulator register ACR in an inverted form.
2. If the contents of the sign flag of mantissa flip-flop Vm and of the sign flag of sum flip-flop Cs differ, an operation signal for substraction is generated. Otherwise, if the contents of the sign flags are equal, an operation signal for addition will be generated.
3. If the operation control signal Op occurs, a subtraction will be generated regardless of the contents of the flip-flop Cs and Vm.
4. If signal Z, which means no "1", is present in the accumulator register ACR, the sign flag of sum flip-flop Cs will be cleared.

Tab. 2 represents the procedure of the control operations for rounding $\bigcirc$ in FIG. 1. After clearing the accumulator register, the sums are fed to the summing network successively by step 2a,2b,3 and an addition operation is generated.

If all addition operations are finished the unrounded result is fed to a computer store Sp or a register. Afterwards the following proofs are generated:

If an overflow or underflow occurred, an overflow signal OF respectively underflow signal UF is delivered to the higher level control circuit for further evaluation e.g. starting correction programs by the computer.

If the evaluation of the signals Z and Oc proves that a rest exists a rounding operation will be carried out in the following way. The plain rest is generated by subtraction of the unrounded sum and then the rest is doubled and finally the unrounded sum is added to this again.

If this rounding operation causes an overflow Of the signal OF is fed to the high level computer, otherwise the rounded result is fed to the computer store SP.

If the computer doesn't demand the rounding operation $\bigcirc$ but one of the other rounding operations by sending signal OP, a rounding upward, downward, or inward operation will be generated dependent on the signals Z, Oc, Zlo, Cs, UF, OF. (Compare Tab 1)

In these cases, the range around zero demands special attention. If signal Z states that the result is non zero and signal UR is delivered as well, corresponding to the special sign Cs of the result and the demanded direction of the rounding operation, the result of the rounding operation is zero or the highest bit position of the mantissa b is a one and all lower positions are zero in a hexadeximal system. Under the last mentioned circumstances, the circuitry provides generating of the mentioned mantissa by control signal A1. In every case control signal M1 is generated, the encoder network for exponent EncE as well delivers exponent of sum Exs representing the amount e1 corresponding to the least exponent's value. To generate at the output to bus BII number zero control signal MgO is applied to the gating network.

The logic equation corresponding to gate generating control signals M0 and M1 are:

$$M1 = Z \wedge UF \wedge (Cs \wedge \nabla \vee \overline{Cs} \wedge \Delta)$$

$$M0 = Z \vee UF \wedge (\lozenge \vee Cs \wedge \Delta \vee \overline{Cs} \wedge \nabla)$$

FIGS. 1a to 1e give details of circuits shown in FIG. 1. As a matter of course other known equivalent circuitries may be implemented as well to fulfill such or the same functions.

In case of using a decimal arithmetic, the summing network must be supplemented by known decimal correction circiutries according to the state of the art.

The shown circiutry delivers the result with double length precision. If delivering with nornal length 1 is wanted the gate circuits Zl and Zr as well as the gates Dc, UF, OF must be reduced to 1 positions instead of 21 and the connections of or-gate Dc must be provided for shifting of 1 positions and this way it is halved in size.

If delivering of the unrounded sum in full length is not demanded the gate circiuts Us, Os, EncE, GM, Exs need not be implemented in maximal length of the sum $|e1| + e2 + 1$ and can further be reduced in size compared to the solution shown.

Figure 1A:
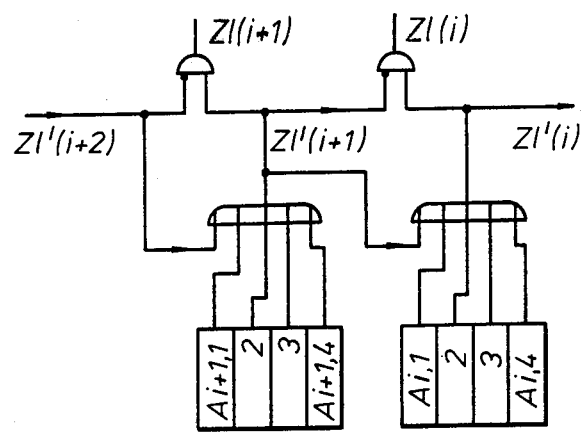

FIG. 1a represents a possible solution for zero detection from left to right. Per tetrade of the accumulator register a signal Zl is generated. A supplement signal Zl' is generated which signals that all positions left of this position contain zero, and it is linked into the next lower position.

Figure 1B:
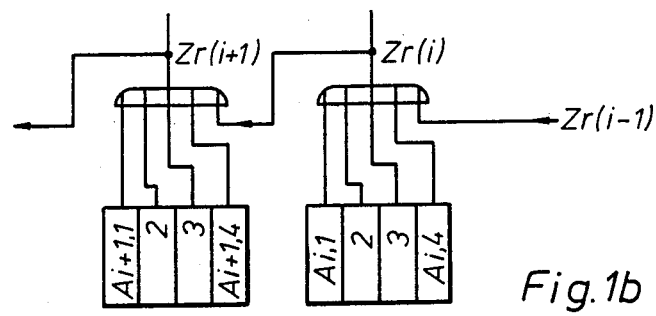

FIG. 1b represents a circuitry for the implementation of zero detection from the right to the left Zr. The generated signals are linked from tetrade to tetrade.

Figure 1C:
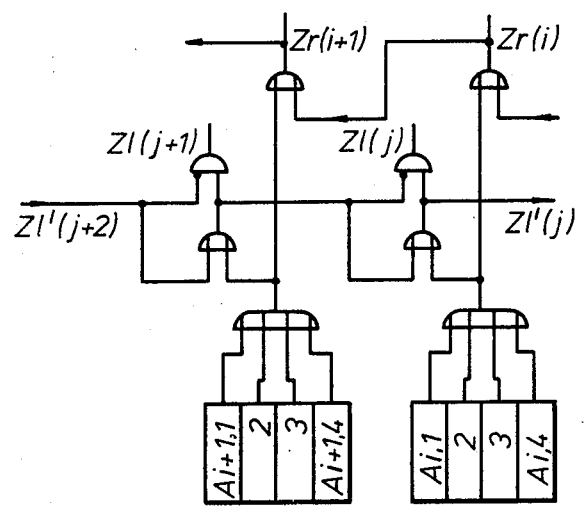

FIG. 1c shows an alternative circuit fo FIGS. 1a and 1b. The or-gates, which prove zero contents of the tetrades, are just implemented singularly.

These circuitries shown serve only as examples and may be replaced by equivalent versions. It is even possible to integrate the summing network partly into the detection circiuts.

Figure 1D:
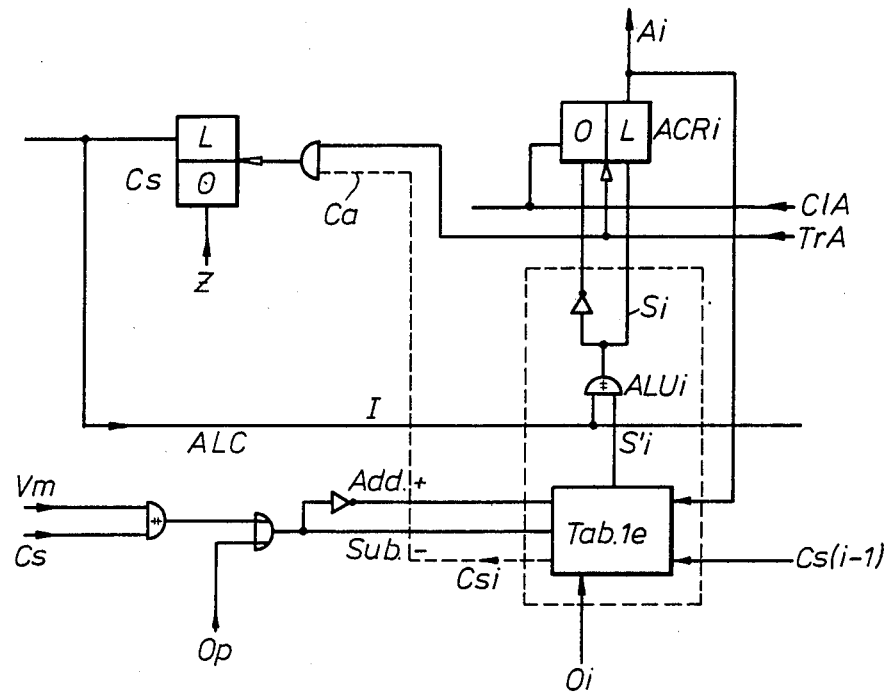

FIG. 1d represents an implementation of the control circuit of ALU operations ALC, which generates the control signals for addition and subtraction.

Additional details of the summing network ALU and the accumulator register ACR are given at hand of a single digit position drawing.

FIG. 1e represents a logic table for summing operations to be performed in the summing network.

Solutions for the construction of adder circuits using table logic or half adders are known to the engineer skilled in the art.

The summing network may be complemented by known carry-look-ahead circuits to accelerate the carry propagation. The table logic shown may be minimezed by omitting the terms in brackets, which are redundant. The control unit of circuitry Contr may be implemented as a logic table control circuit or with a microprogramable control circuit.

The program may be loaded via connection Ld from the high level computer.

FIG. 2 represents other possible circuitry, which in another way implements the invention and generates the same results by a simpler construction, but with more time expenditure. The reference abbreviations correspond to aquivalent functions in FIG. 1. The meaning of the terms and their technical functions are listed in tab. 4. The high level computer is delivering the signals representing the operand for summing in series on information bus line BI and accepts the signals representing the sum in series on information bus line BII. Without changing the principle, it is evidently possible to deliver by the computer the operand mantissa in parallel representation to register B and the exponent of sum to downward counter Ex or deliver the sum out of a certain range of shift register ACR and the exponent out of the counter register containing the exponent of the bus line BII.

The strings of control signals are generated by control unit Contr2, which might be regarded as the control unit's lower level control circuitry of the higher level computer.

This unit Contr2 generates strings of pulses for shifting and counting, and control signals for gating corresponding to the condition and control signals of the registers and counters and dependent on the control signals of the high level computer. Like that shown in the description of the parallel summing network operations, the serial working arithmetic logic unit ALU is controlled by the status of the sign flags.

In case of negative sums, inversion cannot be generated immediately, because an overflow is generated not before the total shifting procedure of the whole register is not finalized.

Thus a memory flip-flop FI is set if an overflow occures, which will inverse the contents during the next turn controlling in order to an exclusive-or-gate. As long as the flip-flop FI is set the counters of registers Zl, Zr cannot be evaluated. In such a case, an additional turn of the shift register ACR must take place.

During this shifting period, control signal T provides shifting keeping the information unchanged, just the counters are active to generate the right content in the counters Zl, Zr.

If the summand is fed to registers B, Ex, Vm register Zl is initialized to the contents 1 and register Zr is initialized to m+t. Afterwards the contents of register Ex is counted downward as shifting in accumulator register ACR takes place until the exponent in Ex become zero and signal ExZ is generated. From now on, this signal causes by control unit Contr2 a feeding of register B with a string of 21 shift pulses SHB while opening of the input of the summing network at the gate with control signal SB. If carries are generated they are temporarily stored and transfered inside the summing network from one shift pulse to the next.

During one total shift turn of the accumulator register, the counting input Ct and Ct- of the counting registers Rl and Zr are linked to the output which is delivering pulses representing the sum Si at the summing unit ALU.

Thereby, the counter Zl is initialized with each "one" signal at it's set input SzL to it's highest state and is counted downward by each "zero" signal. At the end of a whole shift turn of the accumulator register ACR, the contents of the counter will be 21 higher than the position number of the highest non zero digit in the accumulator register ACR.

Circuit FS counts the number of zeros shifted out of the right end of register ACR, until the first "one" finishes the counting gated by means of empty, are delivered.

The comparator circuit Vg, which sompares the contents of the counters in conventional manner, signals whether in a range of more than 1 positions non zero digits are present and thus there is a rest which requires a rounding operation.

The principles of these rounding operations are corresponding to those shown in connection with the parallel working circuitry. (compare tab. 2)

For that purpose, the contents of the downward counter Zl containing the exponent of the sum, which as well as a shift register, is fed onto information bus line BII and via gates onto information bus line BI and further to downward counter Ex. During one turn, shifting the contents of register ACR, controlled by contents of register Ex and started by zero detect signal ExZ, the rest of the unrounded sum is transfered from accumulator register ACR via gate GMC, bus line BII, bus BI into register B.

Started by the control signal for rounding operations Rd of the higher level computer, control unit Contr2 is delivering shifted pulses and control signal GMC gating output from accumulator register ACR onto the information bus line.

If control signal Gms is not accompanied by control signal for rounding operation Rd, the highest positions of the mantissa instead of the rest are fed to information bus line BII by control signal GMC.

Tab 6 shows the functions of the control unit Contr2.

It is evidently possible to achieve an equivalent result using different variations of the control unit and implementations of building blocks.

E.g. if the accumulator shift register consists of building elements which allow parallel access, the counters Zl and Zr may be replaced by circuitry Zl and Zr corresponding to FIG. 1.

Futher on the shift registers, especially ACR, may be replaced by a memory with an addressing counter operating modulo m+2l+t.

In FIG. 4 such an implementation which contains further favorable features is shown.

As a matter of course, in the circuit shown in FIG. 2 most of the time consumed is spent on shifting and not on the actual summing operation. Thus a favorite development consists in applying tapping points in certain distances to the shift accumulator register ACR to provide that during the shifting of the contents of the accumulator register ACR the interval, which logically contains the least significant position for the summing operation, is directly gated to the summing network. After handling of all carries, the shifting procedure is stopped. A counter registrates the actual position of the contents of the accumulator register and provides that further or following operations will start corresponding to this position. For thus purpose, the shift register ACR istself is implemented as a ring shift circuit. This method can especially or favorably be applied in further implementations using magnetic bubble shift register memories.

In case of necessary inversion of the contents of the sum memory, a full shifting turn, follows together with the next summing operation under inversion control signals as slready shown.

Counters Zl and Zr are counted to their final contents during a full shift turn of register ACR after going through the normalized positions.

The described summing networks with reduced serial shifting effort require some more than 2.5l shift steps to generate the sum.

By the circuitry shown in FIG. 3, an acceleration of about five times of the summing operations is achieved, and it requires relatively little additional circuit elements. The shown example requires about 0.5l+5 steps to generate the sum. The accumulator register ACR is organized in words of length l, and the summing network is extended to l positions in parallel.

The mantissa shift register B0, B1, B2 is implemented as a shift register for two directions; first to place the mantissa with length l by serial shifting controlled be a string of shift pulses SHP dependent on the lower positions of the exponent of sum, which is fed to the modulo 1 counter Gxe, and second for parallel shifting of 1 positions to the input of the summing network.

The higher value digits of the exponent of the operand is fed to the modulo n counter Exn whose contents is decoded by address decoder Dec selecting with it's output signal the corresponding memory segment li of the accumulator register ACR.

The reference names and abbreviations used in FIG. 3 correspond to those of FIG. 1 with respect to equivalent functions.

Tab. 5 explains the new references. The bus information lines BI and BII are 1 lines wide.

The parallel gate circuts at the inputs and outputs of the register correspond as well to this multitude. Multiple transmission lines are denoted by cross-lines. The zero detection circuit is implemented likewise 1 positions wide. As a further improvement, the output signals of this curcuitry are stored in flag flip-flops Z1 up to Zn for every word. In this case, by an or-gate it can be proven whether the contents of the accumulator register ACR is zero.

The functions of the summing network correspond to those represented in FIG. 1d and 1e, and the transfer function T is equivalent to that of the serial summing network. The carry, intermediately, is stored word by word by means of carry flag flip-flop Cin.

If a summation of the work with maximum significance 1, which is addressed by a signal En of the modulo n counter Exn, causes a carry signal Co by means of an and-gate, a signal Cs is generated, which via control circuit Contr3 is controlling an inversion cycle of the accumulator register ACR corresponding to the above shown.

Control signals of the higher level control unit and internal signals cause the control unit ContrB to generate strings of pulses for shifting and counting procedures as well as control signals for different gates of the circuitry.

The summing operation is performed in the following steps:

1. The mantissa is transfered to registers B1, B2 by two shift pulses SHP.
2. The exponent is fed under control of transfer signal TrE partly into register Exn and partly in complement form into register Exl.
3. The string of shift pulses SHS for serial shifting of the operator mantissa is fed in form of signal CEl to the input Ct of counter Exl, which reaching counting position 1 delivers signal El into the control unit Contr 3 stopping further shifting.
4. The word li being addressed by the contents of counter Exn is summed to contents of register Bo, and the sum is written back to register li.
5. During two further steps, with a shift pulse SHP, and a count pulse CEn fed to counter Exn, and a following write pulse W, the following two words are summed. As long as a carry occurs, further steps of this kind are applied until the word of highest significance is reached, which then is signaled by the output signal En of counter Exn.
6. If, by an overflow signal from the word of highest significance, an inversion is signaled the total contents of the accumulator register store ACR is word by word addressed by counter Exn and written back while inversion I is applied.

Implementation of the rounding operations is according to the logic scheme given on Table 2.

For that purpose the following steps are carried out:

1. Beginning with the least significant word the sum is the transfered by control signals GMs word by word to information bus line BII and further via bus line BI successively to register B2, B1, Bo until signal Z indicates that the accumulator register ACR is empty.
2. By a string of serial shift pulses SHS, the sum is shifted until the circuit testing signal B2Z indicates that register B2 is empty. Then the unrounded mantissa is present in register B1 and the rest is in register B0. The needed steps were counted by counter Exl.
3. The rest is fed to the vacant word register of accumulator store ACR, and then the rest is doubled, and in case a carry is caused, a shift pulse SHP is applied, and the carry is added to the next work. Finally the rounded mantissa is written into register ACR.
4.1 If this adding operation again caused a carry signal Co the mantissa has it's maximum value, and because all higher positions in the accumulator register ACR contain zero, the mantissa is just placed one position downwards by one serial shift pulse SHS.
4.2 If no carry Co occurred one counting pulse if fed to the modulo E counter Exl. If this causes a carry in counter Exl signal Rd1 counts one step in modulo n counter Exn. Then the mantissa is fed to accumulator register ACR.
5. The mantissa of the sum is delivered to information bus line BII.
6. Under control of control signal GEs the lower order part of the exponent of the sum is delivered from the modulo 1 counter Exl to bus line BII and the higher order part of the exponent is delivered from the inverted outputs from the modulo n counter Exn to bus line BII.

The control unit Contr3 is implemented preferably as usual by a table logic sequence control unit using counters, which comprise three and n counting states. The above description gives the needed input, output and condition information for the logic table.

Variation of the circuitry by equivalent building blocks is possible. It may be changed by replacing the zero detection function provided in register B to control gate network PZ at the summing network output and applying a write control signal to store it in register's positions Z1 to Zn respectively.

The parallel shifting operations in register B also may be executed by a multiplexer addressed by counter Exl. On the other hand the accumulator register ACR may be implemented as a parallel word shifting ring circuit register. For saving of time, the shifting procedure corresponding to the contents of modulo n counter Exn, depending on the exponent is performed simultaneously to by shifting of the mantissa in register B.

A further accelaration can be achieved by providing a summing network with double or triple word length. This expenditure is really efficient, if at a comparable amount like the summing operation, the shifting is as well speeded up e.g. by multiplixer networks.

It is a disadvantage of all shortened summing networks that, in cases of inversion of the sign of sum or propagation of carries over many positions, the time expenditure required is quite high.

The addition of $c = b^{60}$ and $c = -b^{-60}$ shows for example that carries of lendings may effect many figures. Therefore it is an improvement applying instead of a single accumulator or shift register two such units, for initially summing of seperated positive and negative sums and finally subtracting both sums before delivering the results to the bus.

In general such implementation requires arrangements for generating the difference of two long accumulators (shift registers or memories). As a result of such a subtraction eventual cancellation may occur. Such a subtraction operation can be simplified, because it is unnecessary to generate the exact difference of both long registers, but it is sufficient for achieving the final result to subtract the first 21 significant figures and generate an additional flag bit, which signals, wether another non zero figurs follows or not. The figure at position $1+1$ is for example, sufficient for rounding operations to the nearest number and the flag bit for performing rounding operations $\Delta$ and $\nabla$.

The necessary subtraction of both long accumulators (shift registers or memories) at the end can be simplified, if during the summations each of both sum registers, separate indicators Zl and Zr are kept, which signals the first respectively last non zero figure of the related long accumulators (shift registers or memories). The indicators Zl, which indicate for each register the first non zero figure, enable a rapid calculation of the sign of the difference. The indicators Zr, which indicate the respective last non zero figures, enable simple calculation of the mentioned flag bit.

FIG. 4 shows an example of such circuitry with two accumulator registers ACR1 and ACR2. The control operations correspond to those which are explained before. As it can be seen from the drawing always one of both registers is used for simplification of the operations dependend on the sign of the summand's mantissa.

The occurence of inversion is, during the final subtraction of the interim sums, prevented by control means using contents of indicators Z11, Z12. Thus the result is delivered in normalized form.

A fundamental advantage of the represented summing networks is that the whole summing operation can be performed in a limited independent building block, which just contains a bounded amount of local memory. This buliding block with it's local memory is in its size independent of the dimension n of the vectors a and b to be multiplied or of the number n of additions to be executed. The whole summing operation can be performed without using the main memory of the computer.

Access to the local memory inside of the building block is in general faster compared to an access to the main memory of the computer because of shorter internal bus length.

If multiplication operations of scalar products are performed by means of table of multiples it looks favorable to add, without separate preliminary summing the multitude of one multiplicand itself to the long accumulator (shift register or memory). Thus the number of the required adding operations increases from n to $l \cdot n$. On the other hand, the length of each summand is reduced to $1+1$ figures of base b. These adding operations can compfortably be performed in every case by a summing network respectively shift register of the length 21 and some additional positions for the carry.

But such procedure is in general not recommendable, because addition operations performed with the long register are relatively time consuming compared to those required by multiplication operations. Here simplifications can be achieved, because all summands of one multiplication have the same sign, are of short length, and have littel differences in their exponents.

A carry will not occur.

A favorable alternative may be to generate the necessary adding operations, which are required for multiplication operations, by an accumulator of the length 31. Immediately after adding of all multiplication summands, the result can be fed to the long memory into the table position which corresponds to the size of the exponent and thus is available for following adding operations. Such an accumulator may be register B, and the summing network may be jointly used for adding of the interim results of multiplication operations.

According to the invention, a further development of the circuitry consists in using the shift register containing the exponent of the sum and downward counter Ex for summing up the exponents of both exponents of the factors. This addition of exponents may be executed during the same time the multiplication of the mantissas and the addition of the interim products are carried out. Either the counting function of the downward counter Ex may be used for the adding operations, or, if the register Ex is implemented as a shift register, a serial adder may be inserted before this register Ex.

According to the explained use of the long accumulator register, it's contents always had to be cleared by control signal CLA, before a new sum is built up. Further applications are possible, e.g. calculation of scalar products and computings consisting of several long sums.

In these cases the operations do not start with an empty accumulator register, but continue adding up to the earlier contents. This version of scalar products respectively sums provides generating terms of the form $\square(AB+CD)$ with matrices A, B, C, D with maximum accuracy, which may occur by multiplication of block matrices, according to equation (I). If such continuous additions of long sums are not available the matrices A, B, C, D had to be transformed before execution of operations according to the form (AC)

$$\begin{pmatrix} B \\ C \end{pmatrix}$$

by exchange of storage contents.

It is advisable to extend the control unit for special use under control of the higher level computer, and thus provide complete storing of calculated long sums and on the other hand subsequently feeding them back again to the long accumulator for continuing operations of that kind.

By means of an extended control unit, the summing network can be enabled to generate scalar products with maximum accuracy as well as perform simple floating point operations $+$, $-$, $\cdot$, $/$ corresponding to the formula (RG), (R1, R2, R3) and if required (R4).

Two accumulator registers ACR1 and ACR2 are implemented in the circuitry given in FIG. 4. As above mentioned they are organized registers, which can be addressed by address register D2 by means of decoder DD. The sign flag of the mantissa, or the summand Vm, or, in case of generating the result, the presence of the highest non zero figure in the accumulator register ACR1 and ACR2 signaled by means of flip-flop Vs and the attached gates determine, by means of control signal U, a parallel or crossed passing of both registers to the multiplexers MP1 and MP2, by connecting one of both registers to the summing network ACU.

Additionally to the before represented control units, the multiplication of the multiplicands A and B is performed by means of an extension of control unit Contr4 and a table of multiples Vt.

Control signals correspond in their meaning to those used before, and further abbreviations are given in Tab 6.

In addition to accumulator register ACR, a further register ACP of length 31 is effectively implemented. A summing network AD, which sums up interim products, is inserted before this register ACP. The generated mantissa can be derived from there by control signal GPs.

The higher level computer delivers the multiplicands via information bus line BI. The exponents of the multiplicands are by means of pulse signals TrEmA and TrEb transfered to registers RmA and Rmt. Under control of signals VE, SHRA, SHM and SHD these exponents are added by means of summing network ALU, and the result is fed into register D1.

Afterwards the mantissas of the multiplicands stored in register RmA and RmB, are fed to information bus line BI by means of control signal TrEmA and TrmB.

In case the sign glags Va, Vb of the mantissas differ from each other, the flip-flop for sign flag of mantissa Vm is set, which determines with which register the following adding operations will be performed.

Then the mantissa of the multiplicand A will repeatedly be added to the contents of register Rmt, and this way, generated multiples are step by step fed to the table of multiples Vt by means of control signal Wv. The control is achieved by control signals VE, SHRA, SHM and the address counting pulse CtB until the counter CB reaches value b.

Afterwards the figures of the multiplicand B are fed one by one to the address register CB by means of shifting pulse SHmB. Under control of these figures the transfer of the contents of the addressed table register Vt into register Rmt is transfered and its contents is afterwards fed to summing network ALU by means of shifting pulse SHM and gating signal A. By means of transfer signal TrD2, the exponent is fed to counter D2. Afterwards beginning with an exponent controlled position the interim sum is fed to the other input of the summing network, and during this operation shifting of counter D2 by means of signal Cd2 takes place parallel to the shifting of the contents or register RmT. After 21 steps, further counting into counter D2 is done as long as a carry signal Ca is present.

Parallel to this further shifting in register RmB, the exponent in counter D1 is increased by one by application of counting pulse Cd1, and afterwards the exponent is transfered to counter D2. Then the next summing operation is performed. This procedure is repeated 1 times, until register RmB is emptied. Correspondingly on demand further products are generated and added.

If the higher level computer orders delivering of the result, counter D2 is counting down until reaching it's final position, whereby all lower following positions in registers ACR1 and ACR2 are compared for equality. Thus signal Dif is generated and depending on the highest differing position the sign flag flip-flop Vs is set.

Further each unequality generates, by means of the control unit, control signal TrD1 which provides feeding of the complement of the address from counter D2 to counter D1.

Dependent on the position of flip-flop Vs, subtraction of the contents of accumulator registers ACR1 and ACR2 is performed controlled by control signal U and control signal Sub. During the subtraction, counting in counter D1 and D2 is carried on, until the final signal d2 occurs in counter D2 which signals that the highest differing position is reached. The result of subtraction of all higher positions is cancellation and, therefore, these positions need no further consideration.

As the result may contain further zero positions on left hand side, this identified address position is fed to a further register Zl by means of result signal Si, from where it can be recalled being the exponent of the result.

Further a register Zr and a circuit corresponding to that shown in FIG. 2 is provided for detection of the position of the least non zero figures.

By means of the control signals OC, UF, OF and Z, which are generated in the same way as described above, rounding and outputting of the result and the exponent can be controlled.

Thus the circuit shown in FIG. 4 represents a summing network for combined operations which performs the multiplication, the summing, and rounding operations and delivers results with maximum accuracy without spending time on data exchange with higher level storage and address calculations.

The represented implementation is just one example for a whole multiplicity of possible alterations depending on the chosen representation of numbers and construction of register, counters, memories, and the control unit as well as the choice of parallelism of information bus line and gates.

Several other combinations of the function blocks represented as represented in the example are possible, but some of them are not suitable for practical use, because in some cases an unfavorable relation between expenditure on material and achieved speed exists, though reaching the desired effect to generate maximum accuracy.

For example the control unit shown in FIG. 4 may first generate the product with the aid of the main adder and afterwards perform the summing operation with it. Thus an implementation of the summing network AD is unnecessary, but on the other hand the expenditure on control operations increases, and extra time is required on the summing operation.

Independent inventions are revealed by presenting in FIG. 3 the solution for optimum implementation of circuitry concerning expenditure and speed and showing in FIG. 4 the solution for the integration of multiplication and summing network.

Further a combination of the optimum summing network and the integrated arrangement reveals another independent invention, as a combined application of both ideas accelerates the summing operation as well as the multiplication on their own, and further leads to omitting of shiftings of imformation, which are unnecessary in this case, and a further saving of building elements is achieved.

To solve complex tasks it is advantageous to apply several accumulator registers of full length.

In case of a small low-priced computer in which the speed of the orerations is not of eminent importance, nevertheless maximum accuracy shall be achieved, partly the accumulator register may be placed into the register Sp of the higher level computer, because in standard applications only the middle range of the register is used and rather seldom transfer operations of other register parts contents are necessary. Thus, for example, the left and right third of the register may be placed into the memory of the computer without causing an substantial loss of speed. Independent of the special solutions shown, all above shown implementations correspond to a general idea of invention, which shall be explained in the following passages:

For better understanding FIG. 5 comprehends several basic solutions.

Figure 5A:
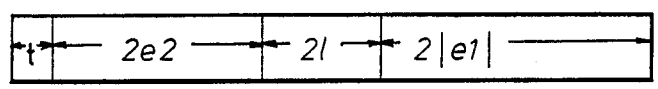
FIGS. 5a-e show basic circuits.

FIG. 5a shows a schematic diagram of a summing network of a length which provides adding up of all summands without loss of information. The register is of length $2e2+2l+2|e1|$, and thus all summands can directly be placed in the correct position in fixed-point notation without an exponent. To provide some space for carries which might be caused by the adding operation, further positions for figures of the base b of the used number system are provided on left hand side. Thus every sum (II) of n summands can be evaluated correctly without loss of information by the long summing network. Even if $b^{t+l}$ carries are caused, they can be kept without loss of information.

At hand of three typical examples, we shall point out the length of this parallel working summing network:

(a) Given is $b=10$, $t=3$, $l=8$, $e1=-30$ and $e2=30$. In this case the summing network is of length $t+2e2+2l+2|e1| =142$ decimal digits. In case of a BCD code this corresponds to 568 bit or 71 byte.

(b) Given is $b=16$, $t=4$, $l=14$, $e1=-72$ and $e2=72$. This requires a length of $t+2e2+2l+2|e1| =320$ hexa decimal positions, which correspond to 1280 bit or 160 byte.

(c) Given is $b=10$, $t=4$, $l=13$, $e1=-99$ and $e2=99$. In this case the summing network comprises the length of $t+2e2+2l+2|e1| =426$ decimal digits which correspond in case of a BCD code to 1704 bit or 213 byte.

Working together with a shift register of corresponding length as mentioned above, the serial summing network A, represented in FIG. 5, is able to add two numbers with base b with appropriate saving of carries.

Simultaneously to every adding operation, the contents of the shift register is transferred one step to the right to the input of the summing network. The exponent of the sum determines the right or correct time to apply the summand to the other input of an adder for being properly added up.

Figure 5B:
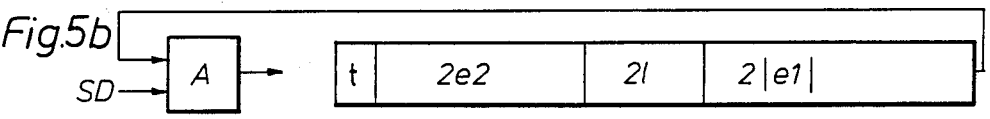

FIGS. 5a and 5b present solutions of extreme parallelism and serialism, but intermediate solutions of combinations of both are possible and will be explained in the following passages.

In circuit FIGS. 5a and 5b all figures are added, though most of the positions are unoccupied. In the following solutions are shown which minimize the number of adding positions to such cases where actual figures are present and the adder network is reduced in size. The full information of the long sum is just kept in a store register covering full length. Therefore, an accumulator storage register of the same length corresponding to FIGS. 5a and 5b is used.

Figure 5C:
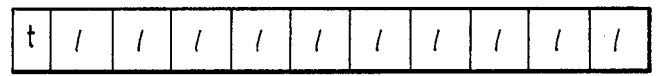
Figure 5D:
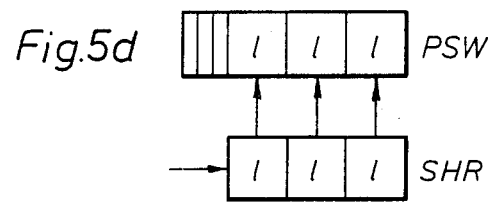

FIG. 5c represents a register which is divided in words of length 1. Because a single summand covers a length of 2l, it fits, in respect of the number of positions, on a section of the register with the length 3l. The special section, the contents of which should be handled, of the long register is determined by the exponent of the summand. Under control of the exponent, its contents will be extracted form the register and fed to a parallel summing network PSW of length 3l represented in FIG. 5d. The summand, which is to be added, is fed to a shift register SHR of the same length, placed correspondingly to the exponent, and afterwards added to the register content.

This addition may cause a carry. In order to save it without spending much on control operations and time, the accumulator register should be extended for some positions to the left to provide enough room for results extending to more than 3l positions.

If not all the figures in the overflow positions correspond to b-1, a carry caused by an addition will be absorbed by these additional figures. As we cannot exclude the possibility that all figures correspond to b-1, an additional control will link via intermediate saving stations the adding of the carry to the next higher ranking figures of the long accumulator storage register as required. Eventually this linking operation must be executed several times.

Figure 5E:
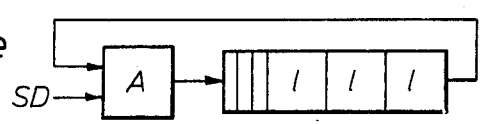

FIG. 5e represents an example working with a long storage register corresponding to FIG. 5c and a limited serial summing network, which performs serial addition of the summand into the correct position controlled by the exponent.

Evidently, the correct evaluation of eventually caused carries its possible likewise to the method shown above.

The results of all operations according to examples given in FIG. 5 are rounded to n positions after adding up of n products $c_i$. In order to perform a rounding operation to the nearest number of the number grid, it is sufficient to identify the $(1+1)^{th}$ position of the result. In order to identify the highest 1 respectively $1+1$ figures of the result of the addition, a pointer is employed which always signals the first non zero figure at left hand side during the adding operation.

The employed pointer enable to find out whether a non zero figure follows right to position 1 and provide correct generating of rounding operation $\Delta$ and $\nabla$. A second pointer, which keeps from the summing operation the last non zero position, provides immediate delivering of the required information and thus rapid execution of the rounding operation $\Delta$ and $\nabla$.

The block diagram FIG. 6 respresents the general case of a combined computing network for performing multiplications and additions, and Tab. 7 gives a flow chart for control operations, which comprises the basic functions. Both examples shown assume the implementation of two accumulator storage registers.

The following adding operation is to be generated:

$$c = \square \sum_{i=1}^{n} p_i \cdot q_i = \square \sum_{i=1}^{n} c_i; \; c_i = p_i \cdot q_i$$

Given is $p_i, q_i \in S(b,1,e1,e2)$: $c_i \in S(b,2l,2e1-1,2e2)$ and $\square \in \{O, \Delta, \nabla, \}$.

The general case of $b>2$ is admitted. The multiplication is generated by means of the table of multiples Vt of one of the multiplicands.

The mantissa of the floating point numbers $p_i, q_i$ and $c_i$ are represented as $mp_i$, $mq_i$ and $mc_i$, the exponents as $ep_i$, $eq_i$, $ec_i$, and the intermediate sums correspond to S1 and S2. The structure diagram of table 7 denotes as usual statements in form of rectangles, labels in form of circles, and conditions in form of hexagons. Statements belonging to a do loop are framed and are following the heading of the loop.

FIG. 6 is showing the summing network ALU of length 31 and some overflow positions and the register SHR, which may be implemented for example as a shift register. The exponents are added in the summing network delivering exponent E.

The generated intermediate sums are fed to accumulator register ACR1 respectively ACR2. The rounding network RD delivers the final result to the higher level circuitry.

Particular steps of the procedure represented in table 7 observes the following sequence:

1. The long registers S1 and S2 are cleared.
2. If one of the vector components $p_i$ or $q_i$ is zero, no summing operation is performed.
3. The exponent of the product $p_i \cdot q_i$ is generated by a summing network for exponents or by the summing network ALU. In the last case, the result is transfered into an exponent register E and stored there.
4. A multiple of one of the multiplicands is generated. The multiples are stored into a table of multiples. This step is not necessary in case of the binary number system. In cases of other multiplication methods, this step must be replaced by other appropriate measures.
5. The product of the mantissas $p_i \cdot q_i$ is generated.
6. Dependent on the exponent $ec_i$, the mantissa $mc_i$ is shifted corresponding to a section of length 31 of the local memory.
7. Positive summands are added up into register S1, negative summands are added into register S2.
8. Identification and evaluation of carries is performed.
9. The difference of the contents of the two long registers is generated.
10. The result is rounded to length 1 by rounding operations , $\Delta$, $\nabla$ or . The rounding circuit represented in the block diagram may stand for a complete rounding circuitry or may be an indicator signaling the marking bit position and an indicator giving the least non zero position to be further evaluated by the higher level computer.

As mentioned above, it is useful also to provide another version of control circuitry to allow the calculation of scalar products where step 1, the clearing of both registers ACR1 and ACR2 at the beginning of each operation is omitted.

Steps 2 to 5 describe the multiplication operation of the mantissas $mp_i$ and $mq_i$. Steps 6 to 8 state adding operation of $mc_i$ to positions of S1 respectively S2 under control of exponent $ec_i$.

During step 9, the substraction operation with the long register is performed.

Preferably the implementation provides parallel execution of certain independent operations.

In case of generating scalar products, the following scheme represents parallel operations:

$s := 0$; $ec_1 := ep_1 + eq_1$; $mc_1 := mp_1 \cdot mq_1$;
$S := s + c_1$; $ec_2 := ep_2 + eq_2$; $mc_2 := mp_2 \cdot mq_2$;
$s := s + c_{n-1}$; $ec_n := ep_n + eq_n$; $mc_n := mp_n \cdot mq_n$;
$s := s + c_n$ In gerneral the multiplication operation requires much more time than both adding operations. Thus the acceleration achieved by the above described measures is relatively small.

Another favorable implementrabtion employs several parallel working multiplication networks, which feed summands to a summing and rounding network. Moreover, the maximum number of multiplication networks should provide optimum utilization of the summing and rounding network.

Further acceleration can be achieved, by implementing several summing networks, which generate part sums of a scalar product, which if all interim results are available, are finally summed and rounded to generate the total and rounded sum.

Since in Numerical Analysis scalar products hardly occur alone, the higher level computer could provide several scalar product units as described above and perform scalar products, that occur simultaneously in a program and are independent, in parallel. This would speed up the performance of the computer considerably.

A further extension of the scope of the invention is to adapt it to summing of triple or n-tuble products without interim rounding. In the following this is shortly explained with respect to triple products.

The accumulator register ACR in this case is of length: $3e2 + 31 + 3|e1| + t$ cells.

The summing unit ALU shown in FIG. 6 is of length $41 + t$ cells.

The multiplication table Vt in FIG. 4 has storage cells of length 21 cells.

The denominator of the gating circuits m has the size $3e2 + 3|e1|$.

The length of register B is 31 cells. The counters and control circuitry pulse generators have a capacity corresponding to the size of the registers being under their respective control.

If the circuitry is provided for the handling of triple or n-tuple products it is advantageous to install gates to the registers which select the proper length of the registers and provide range select gates to the counters, whereby the selector gates are under control of the higher level computer which signalizes the size wanted in a certain case.

This way no time is lost in case a smaller number of factors is used. The control information is delivered from the high level computer into a register at the output of which a n-way decoder is connected feeding his output signal to the respective gates.

TABLE 1

| List of Symbols | |
|---|---|
| R | set of all real numbers |
| N | set of all integers $N = \{1,2,3,4 \ldots\}$ |
| $a \in M$ | a is element of set M |
| $\bigwedge_{a,b \in M}$ | read: for all $a,b, \in M$ |
| := | determining equal sign, determining equality of the expressions on both sides of this sign |
| $\sum_{i=1}^{n} c_i$ | $= c_1 + c_2 + c_3 + \ldots + c_n$ |
| ○ | rounding to nearest number  |
| $\nabla$ | rounding downward 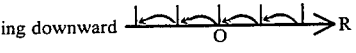 |
| $\Delta$ | rounding upward 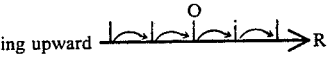 |

TABLE 1-continued
List of Symbols

| | | |
|---|---|---|
| ◇ | rounding inward | 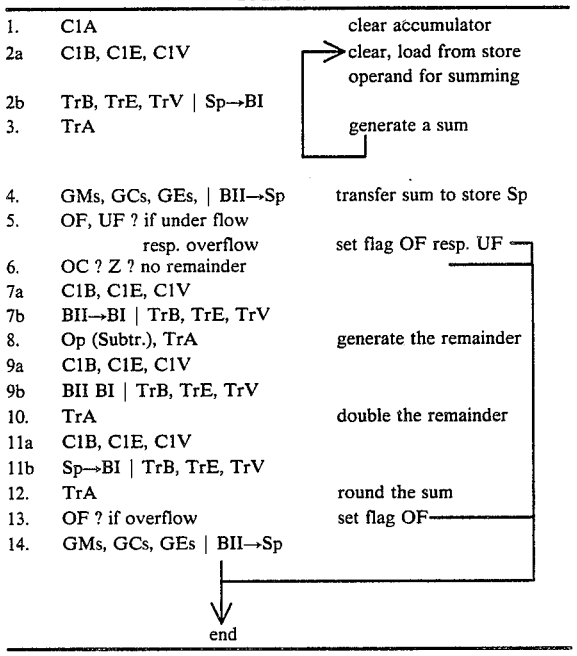→R |
| □ | general rounding operator □∈ {○, ∇, Δ, ◇} | |
| S(b,l,e1,e2) | floating-point system with basis b, mantissa length of l digits, smallest exponent is e1, largest exponent is e2 | |
| i = 1(1)n | i is running from 1 to n in steps of unit 1 | |
| $T^n$ | powerset; set of all n-tupel $(a_1, a_2, \ldots, a_n)$ with $a_i \in T$ for all $i = 1(1)n$. | |

TABLE 2

| | | |
|---|---|---|
| 1. | ClA | clear accumulator |
| 2a | ClB, ClE, ClV | clear, load from store operand for summing |
| 2b | TrB, TrE, TrV \| Sp→BI | |
| 3. | TrA | generate a sum |
| 4. | GMs, GCs, GEs, \| BII→Sp | transfer sum to store Sp |
| 5. | OF, UF ? if under flow resp. overflow | set flag OF resp. UF |
| 6. | OC ? Z ? no remainder | |
| 7a | ClB, ClE, ClV | |
| 7b | BII→BI \| TrB, TrE, TrV | |
| 8. | Op (Subtr.), TrA | generate the remainder |
| 9a | ClB, ClE, ClV | |
| 9b | BII BI \| TrB, TrE, TrV | |
| 10. | TrA | double the remainder |
| 11a | ClB, ClE, ClV | |
| 11b | Sp→BI \| TrB, TrE, TrV | |
| 12. | TrA | round the sum |
| 13. | OF ? if overflow | set flag OF |
| 14. | GMs, GCs, GEs \| BII→Sp | |
| | end | |

TABLE 3a

| | |
|---|---|
| ACR | accumulator register |
| ClA | clear accumulator |
| TrA | transfer from ALU into ACR and transfer Ca from ALU into ACR |
| Ca | carry from summing network |
| Cs | sing flag of sum; counting flip-flop |
| ALU | summing network (+, −, invert) |
| BI, BII | information bus lines |
| ClV | clear sign-flag of mantissa |
| TrV | transfer sign-flag of mantissa |
| ClE | clear exponent register |
| TrE | transfer into exponent register |
| B | register containing mantissa of sum operand (B) |
| ClB | clear register B |
| TrB | transfer into register B |
| Dec 1 | decoder of exponent and sign |
| Ok,i,r | or-gates connected to input of ALU: wired-or |
| Uk,j,r | and-gates gating signals of B and DecE |
| Ai | output positions i from ACR |
| Si | output positions i from ALU connected to inputs of ACR |
| TA | overflow register part of ACR |
| ALC | control circuit of ALU operations |
| Vm | sign flag of mantissa; flip-flop |
| GC | sign gate of sum (Cs) (tri-state-gate) |
| GCs | control signal GC on bus BII |
| Zl | zero-detection from left to right circuit |
| Zr | zero-detection from right to left circuit |
| Zs,j,i,r | and-gates gating accumulator sum-output and Zl |
| Os,i,r | or-gates connecting mantissa of the sum, wired-or |

TABLE 3a-continued

| | |
|---|---|
| Ex,Ve | exponent register of sum operand |

TABLE 3b

| | |
|---|---|
| Gm | gate generating mantissa of sum, tri-state-gate |
| GMs | control signal GM on Bus BII |
| Oc | or-gate delivering "no remainder right of mantissa of sum", wired-or |
| Zlo | no "1" detected by Zl circuit |
| Zr(m+1) | no "1" detected from right up to position m+t |
| Z | no "1" in ACR detected |
| Vz | and-gate gating Zr and Zl signals, output connected to Oc |
| EncE | encoder network for exponent |
| Exs | gates delivering exponent of sum ⎫ tri-state-gates |
| Ves | gate delivering sign of exponent of sum ⎬ |
| Ts | gate-delivering overflow of sum: (TA) ≠ 0 ⎭ |
| GEs | control signal gating exponent signals on Bus BII |
| Op | operation control signal: subtract/regardless of signs |
| Contr | control unit of circuitry shown |
| Sp | computer store |
| St | computer control unit |
| $OF_1$, OF | overflow signal (ACR)>c max |
| $UF_1$, UF | underflow signal (ACR)<c min |
| M1 | control signal outputting: smallest mantissa, e1 |
| Mo | control signal outputting: mantissa zero, e1 |
| Rd | control signals for rounding operations ○, Δ, ∇, ◇ |
| Ld | signals loading information into Contr. |

TABLE 4

| | |
|---|---|
| ACR | shift register, m+2l+t tetrades |
| SHA | string of m+2l+t shift pulses to ACR |
| SHL | last shift puls of string SHA |
| B | shift register, 2l tetrades |
| SHB | string of 2l pulses to B |
| Ex | shift register containing exponent of sum operand; downward counter |
| SHE | string of shift pulses to Ex |
| Ct- | counting input of counter Ex |
| ExZ | zero detect signal of Ex |
| Zl | shift register containing exponent of sum; downward counter |
| Sh, Zl | string of shift pulses to Zl |
| SZl | input of Zl for putting m+t into Zl |
| ZlZ | zero detect signal of Zl |
| Ts | output overflow signal of Zl |
| Zr | counter; number of zeros from right to left in ACR, capacity m+l+t |
| SZr | input of Zr for putting −1 into Zr before start of counting |
| Z | (Zr) = 1+m+t (all ones) ∼ (ACR) = 0 |
| Vg | compare circuit (Zr) ≧ (Zl)? |
| Oc | output of Vg |
| FS | flip-flop, set by the first generated one of a sum |
| FI | flip-flop, set by overflow Ca for one shift cycle ACR, it controls the inversion of output signals of ACR |
| Contr.2 | generator of shift and control pulses detailed in FIG. 2a |
| ALU | summing unit performing addition, subtraction or transfer (T) form Ai to Si |
| T | transfer control signal for to ALU |
| SB | control signal controlling shift of (B) by SHB |
| Rd | signal controlling rounding operation |
| ALC | control circuit of ALU |
| GMZ | control signal gating output from ACR |
| SA | control signal gating sum into ALU |

TABLE 5

| | |
|---|---|
| ACR | accumulator register containing words l1...ln |
| W | write into ACR signal |
| Dec | address decoder circuit of ACR |
| Dcn | highest ranging output of DEC |
| Z1+Zn | register positions Zi containing one bit per word li |
| Z | nor-gate detecting if all (Zi) are zero, which means (ACR)=0 |

TABLE 5-continued

| | |
|---|---|
| PZ | gate arrangement detecting if all digits in ALU are zero |
| ALU | parallel operating arithmetic unit with l digits |
| Co | carry output |
| Cin | carry flag |
| Bo, B1, B2 | mantissa shift register of length 31 containing shift gates for serial shift and parallel shift |
| SHS | string of shift pulses for Bo,1,2, serial shift |
| SHP | string of shift pulses for Bo,1,2, parallel shift |
| SH | control pulse during SHP shift |
| B1U, B2U | serial coupling |
| B2Z | circuit testing: (B2) $\neq$ 0 ? |
| Exl | modulo l counter containing exponent of l digit positions (lower order part) |
| Exn | modulo n counter containing exponent of n digit positions (higher order part) |
| TrE | load complement (BI) into Exl and (BI) high order positions into Exn |
| CEl | counting signals to Exl |
| CEn | counting signals to Exn |
| El | (Exl) = l output signals |
| En | (Exn) = n output signals |
| Ts | overflow positions in register Exn |

TABLE 6

| | |
|---|---|
| ACR1 | memory containing 2l+m+t digits |
| ACR2 | memory containing 2l+m+t parallel of ACR1 |
| DD | address decoding network to ACR |
| D1 | counter modulo 2l+m+t, shift register, address of ACR, |
| SHD | string of shift pulses to D1 |
| D2 | counter, length 2l+m+t |
| Cd1, Cd2 | counting pulses to D1,D2 resp. |
| TrD1, TrD2 | transfer control pulses (D1) D2 resp. (D2) D1 |
| d1,d2 | last position of counter D1,D2 resp. reached, signal |
| U | sign depending control signal to MP1, MP2 |
| MP1, MP2 | cross-parallel multiplexer |
| M1 | demultiplexer |
| RmA | mantissa resp. exponent shift register of multiplicand A, |
| SHRA | string of l shiftpulses to RmA |
| TrE, MA | control pulse loading from bus B I into RmA |
| Vt | table memory for multiples, length 2l |
| Wv | control signal writing into Vt |
| Rmt | multiples resp. exponent shift register of multiplicand B, |
| Res | clear Rmt |
| SHM | string of 2l shift pulses to Rmt |
| TrEb | load signal of exponent of multiplicand B |
| DB | address decoder of Vt |
| RmB | shift register of multiplicand B, length 2l |
| CB | address counter, length equal to basis b (tetrade) |
| b | last position of counter CB reached, signal |
| SHmB | string of l shift pulses to Rmb |
| CtB | counting pulses to address tetrada circuit |
| TrmB | control signal loading mantissa of multiplicand B |
| Dif | signal stating unequality of ACR1 to ACR2 |
| Vs | sign flag of sum |
| Zls | output signal of shift register Zl |
| ClV | clear signal |
| Contro.4 | control unit |
| AD | adder unit |
| ACP | register containing mantissa of product, length 3l |
| GPs | control signal gating mantissa of product to bus BII |

I claim:

1. In an electronic computer operating in a floating point system and wherein data is defined as a function of (b, l, $e_1$, $e_2$) where b is the base, l is the number of digits of the mantissa, $e_1$ is the least exponent and $e_2$ is the highest exponent, the improvement comprising means receiving two floating point vectors each having a finite number of vector components for performing a scalar product operation thereon with maximum accuracy wherein the scalar product is produced from a sum of a plurality of partial scalar products of the vector components, including first means for performing fixed point arithmetic operations on the mantissas and exponents of each of the vector components to produce the plurality of partial scalar products, second means receiving the partial scalar products from the first means for storing each partial scalar product in fixed point format in a store having a length L which is $2l+2e_2+2$ times greater than the absolute value of $e_1$; third means receiving the partial scalar products from the second means for summing the stored fixed point partial scalar products; fourth means receiving the summed partial scalar products from the third means for rounding the resulting sum of partial scalar products to the floating point number closest thereto to obtain maximum accuracy; and fifth means receiving the rounded sum from the fourth means for converting the rounded sum into floating point format.

2. The computer according to claim 1, wherein the first means for performing fixed point arithmetic operations includes an arithmetic unit and the second means for storing comprises an accumulator having the length L.

3. The computer according to claim 2, wherein the accumulator comprises two registers of length L and means for storing negative numbers in one register and positive numbers in the other register.

4. The computer according to claim 3, wherein the arithmetic unit comprises a register of length L.

5. The computer according to claim 2, wherein the first means comprises a mantissa register into which the mantissa of each number is loaded an exponent register into which the exponent of each number is loaded and the control and logic circuits are connected to the outputs of mantissa and exponent registers to feed the mantissa to the arithmetic unit to be summed and into the accumulator wherein the exponent defines the digit positions in the accumulator.

6. The computer according to claim 5, wherein the control and logic circuits produce a first control signal indicating the position of the cells in the accumulator containing the most significant digit, a second control signal indicating the position of the cells containing digits of significance, a third control signal indicating that the accumulator contains all zeros, a fourth control signal indicating if there are no zero digits contained in cells (Ai, j) outside a range of at least once the length of the mantissa of the factor (pi), a fifth signal indicating that digits of higher significance compared to a limit are present in the cells, and a sixth signal indicating that only digits of lower significance compared to a limit are present in the cells.

7. The computer according to claim 2, further comprising a gate arrangement connected between the outputs of a summing network of the arithmetic unit and the inputs of the accumulator for delivering the absolute value of the sum generated in the summing network to the accumulator.

8. The computer according to claim 5, wherein: the arithmetic unit comprises a parallel working unit of a length equal to the length of the accumulator and the control and logic circuits connect the outputs of the mantissa register to the inputs of the arithmetic unit defined by the contents of the exponent register.

9. The computer according to claim 5, wherein the accumulator comprises a serial working register and the arithmetic unit operates serially and the control and logic circuits and the exponent register comprise are counters and shift registers and the mantissa register is connected to the arithmetic unit during times given by the contents of the exponent register and that the times of rounding and delivering of the floating point number are defined relative to the timely appearance of the most significant digit of the serial information string of the accumulator contents.

10. The computer according to claim 2, wherein the accumulator register consists of sections with parallel addressable access a length equal to the length of the mantissa of the factor (pi) and the arithmetic is organized in parallel having at least the same length as the sections.

11. The computer according to claim 2, wherein the accumulator comprises two registers and multiplexer circuits for alternatively connecting same to the inputs and outputs of the arithmetic unit.

12. The computer according to claim 1, wherein the second means comprises accumulator register of the length of at least n-times the length of the mantissa plus n-times the sum of the absolute value of the smallest and largest exponent.

* * * * *